US006718250B2

(12) United States Patent
Rueger et al.

(10) Patent No.: US 6,718,250 B2
(45) Date of Patent: Apr. 6, 2004

(54) METHOD AND APPARATUS FOR PROVIDING CONTROL PARAMETERS TO OR WITHIN A CONTROL SYSTEM

(75) Inventors: Johannes-Jörg Rueger, Vaihingen/enz (DE); Martin Thomas, Kraichtal (DE); Josef Newald, Stuttgart (DE); Udo Schulz, Vaihingen/enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/824,375

(22) Filed: Apr. 2, 2001

(65) Prior Publication Data

US 2001/0037172 A1 Nov. 1, 2001

(30) Foreign Application Priority Data

Apr. 1, 2000 (EP) ........................................ 00106972

(51) Int. Cl.[7] .............................. B60T 7/12; G06F 7/00

(52) U.S. Cl. .................. 701/103; 701/115; 123/406.65; 123/339.23

(58) Field of Search ................................ 701/103, 104, 701/105, 29, 48, 102, 38, 115, 65, 56, 84; 123/490, 295, 480, 406.65, 486, 339.23

(56) References Cited

U.S. PATENT DOCUMENTS

| | | | | | |
|---|---|---|---|---|---|
| 4,987,544 | A | * | 1/1991 | Honda et al. | 364/431.05 |
| 5,387,834 | A | | 2/1995 | Suzuki | |
| 5,689,414 | A | | 11/1997 | Eitrich | |
| 5,829,419 | A | | 11/1998 | Sadkin et al. | |
| 5,884,211 | A | * | 3/1999 | Pauli et al. | 701/115 |
| 5,934,258 | A | * | 8/1999 | Watanabe | 123/490 |
| 6,055,475 | A | * | 4/2000 | Moriyama | 701/56 |
| 6,122,574 | A | * | 9/2000 | Ohtsu et al. | 701/29 |

FOREIGN PATENT DOCUMENTS

| | | |
|---|---|---|
| DE | 197 29 844 | 1/1999 |
| DE | 197 42073 | 3/1999 |
| EP | 0 371 469 | 6/1990 |
| EP | 0 379 182 | 7/1990 |
| EP | 0 494 467 | 7/1992 |
| EP | 0 504 585 | 9/1992 |
| GB | 2232272 | 12/1990 |

* cited by examiner

*Primary Examiner*—Willis R. Wolfe
*Assistant Examiner*—Johnny H. Hoang
(74) *Attorney, Agent, or Firm*—Kenyon & Kenyon

(57) ABSTRACT

A Method and an apparatus for providing control parameters to or within a control system for controlling a fuel injection system are described. The method is characterized in that a plurality of control parameters is transmitted to storage means (810) within the control system by transmission means (850). The transmitted control parameters are stored within the storage means (810). Selection parameters are transmitted to selection means (800) within the control system by transmission means (840). Stored control parameters are selected in accordance with transmitted selection parameters by the selection means (800). And the selected parameters are utilized for controlling elements within the control system. The apparatus is in particular eligible for usage with a inventive method and is characterized in that a control unit (D) and an activation IC (E) are connected to each other by transmission means (840, 850). Storage means (810) are implemented in the activation IC (E). And selection means (800) are implemented in the activation IC (E).

12 Claims, 6 Drawing Sheets

METHOD AND APPARATUS FOR PROVIDING CONTROL PARAMETERS TO OR WITHIN A CONTROL SYSTEM

FIELD OF THE INVENTION

The present invention concerns a method as defined in the preamble of claim 1 and an apparatus as defined in the preamble of claim 11, i.e. a method and an apparatus for providing control parameters to or within a control system.

BACKGROUND INFORMATION

Control systems generally comprise a control unit typically but not necessarily comprising a central processing unit (CPU), at least one controlled element and utilization means which transform CPU signals if and as necessary and apply them to the controlled element. For this purpose, the CPU and the utilization means need to be connected to each other by communication means such as a bus system. Moreover, external data may need to be communicated to the CPU and/or the utilization means on a corresponding way.

As an example, piezoelectric elements may be used as actuators in fuel injection nozzles (in particular in so-called common rail injectors) of an internal combustion engine. In this example, fuel injection is controlled by means of applying voltages to piezoelectric actuators which expand or contract themselves as a function of the voltage applied. Resulting thereof, an injector needle which is connected to the piezoelectric actuators by means of a transfer system is moved up and down and therefore an injection nozzle is opened and closed. However, the movement of the injector needle is principally influenced by changing rail pressures to which the transfer system and the needle are exposed. In order to nevertheless control the movement of the injector needle with high precision respectively to control the corresponding amount of injected fuel with high precision these influences have to be taken into account. Hence, the appearing rail pressures are measured by measuring means and the voltages which are applied to the piezoelectric actuators are modified in a corresponding way. As a result, a feedback system is implemented, in which rail pressures are measured by measuring means, the measured values are communicated to the control unit, corresponding voltages for the piezoelectric actuators are calculated within the control unit and are communicated from the control unit to an utilization unit, for example an activation IC, from which they are applied to the piezoelectric actuators. The use of piezoelectric elements as actuators proves to be advantageous, inter alia, in fuel injection nozzles for internal combustion engines. Reference is made, for example, to EP 0 371 469 B1 and to EP 0 379 182 B1 regarding the usability of piezoelectric elements in fuel injection nozzles.

Piezoelectric elements are capacitative elements which, as already partially alluded to above, contract and expand in accordance with the particular charge state or the voltage occurring therein or applied thereto. In the example of a fuel injection nozzle, expansion and contraction of piezoelectric elements is used to control valves that manipulate the linear strokes of injection needles. The use of piezoelectric elements with double acting, double seat valves to control corresponding injection needles in a fuel injection system is shown in German Patent Applications DE 197 42 073 A1 and DE 197 29 844 A1, which are incorporated herein by reference in their entirety.

Fuel injection systems using piezoelectric actuators are characterized by the fact that, to a first approximation, piezoelectric actuators exhibit a proportional relationship between applied voltage and the linear expansion. In a fuel injection nozzle, for example, implemented as a double acting, double seat valve to control the linear stroke of a needle for fuel injection into a cylinder of an internal combustion engine, the amount of fuel injected into a corresponding cylinder is a function of the time the valve is open, and in the case of the use of a piezoelectric element, the activation voltage applied to the piezoelectric element.

FIG. 6 is a schematic representation of a fuel injection system using a piezoelectric element 2010 as an actuator. Referring to FIG. 6, the piezoelectric element 2010 is electrically energized to expand and contract in response to a given activation voltage. The piezoelectric element 2010 is coupled to a piston 2015. In the expanded state, the piezoelectric element 2010 causes the piston 2015 to protrude into a hydraulic adapter 2020 which contains a hydraulic fluid, for example fuel. As a result of the piezoelectric element's expansion, a double acting control valve 2025 is hydraulically pushed away from hydraulic adapter 2020 and the valve plug 2035 is extended away from a first closed position 2040. The combination of double acting control valve 2025 and hollow bore 2050 is often referred to as double acting, double seat valve for the reason that when piezoelectric element 2010 is in an unexcited state, the double acting control valve 2025 rests in its first closed position 2040. On the other hand, when the piezoelectric element 2010 is fully extended, it rests in its second closed position 2030. The later position of valve plug 2035 is schematically represented with ghost lines in FIG. 6.

The fuel injection system comprises an injection needle 2070 allowing for injection of fuel from a pressurized fuel supply line 2060 into the cylinder (not shown). When the piezoelectric element 2010 is unexcited or when it is fully extended, the double acting control valve 2025 rests respectively in its first closed position 2040 or in its second closed position 2030. In either case, the hydraulic rail pressure maintains injection needle 2070 at a closed position. Thus, the fuel mixture does not enter into the cylinder (not shown). Conversely, when the piezoelectric element 2010 is excited such that double acting control valve 2025 is in the so-called mid-position with respect to the hollow bore 2050, then there is a pressure drop in the pressurized fuel supply line 2060. This pressure drop results in a pressure differential in the pressurized fuel supply line 2060 between the top and the bottom of the injection needle 2070 so that the injection needle 2070 is lifted allowing for fuel injection into the cylinder (not shown).

In the example considered, as well as in other control systems, there is a need for a fast communication between the individual components of the control system, particularly between the control unit and the utilization unit, in order to perform a feedback which is as close to realtime as possible. However, there is a delay in accordance with the transmission speed of the communication means as well as with the amount of data which is to be transmitted. Even in control systems which do not require a realtime performance relevant delays may occur for the same reasons. Moreover, for several reasons, such as cost cutting or due to limitations by properties of standard components which are used within a control system, it is often required to use relatively slow communication means instead of the fastest available. Hence, while providing control parameters to or within a control system delays have to be taken into account as according to the state of the art.

It is an object of the present invention, to provide an improved method and apparatus for providing control parameters to or within a control system.

SUMMARY

This object of the present invention is achieved by the object of method claim 1, i.e. a method for providing control parameters to or within a control system, in which a plurality of control parameters is transmitted to storage means within the control system by transmission means. The transmitted control parameters are stored within the storage means. Selection parameters are transmitted to selection means within the control system by transmission means. Stored control parameters are selected in accordance with transmitted selection parameters by the selection means. Then, the selected parameters are utilized for controlling the system. Furthermore, the object of the present invention is achieved by the object of apparatus claim 11, i.e. an apparatus, in particular eligible for usage with the inventive method, which comprises a control unit and an activation IC connected to each other by transmission means, storage means which are implemented in the activation IC, and selection means which are implemented in the activation IC.

As stated in claims 1 and 11, the general approach of the invention is to predictively provide a plurality of control parameters in advance and then to further provide selection parameters within a control system. Hence, the amount of control data which are transmitted between the individual components of the control system is increased. However, recalling, that it is an object of the invention to avoid disadvantages due to transmission delays, one would expect that it is therefore necessary to reduce the amount of control data which are transmitted to the minimum. Therefore, the approach of the invention, namely increasing instead of reducing the amount of transmitted control data, is just the opposite of what one would expect to be an eligible approach. Beyond this background, the surprising effect of the invention is that by means of the inventive approach the performance of the control system is improved.

Preferably, the control system comprises a control unit and an activation IC. The control parameters are transmitted within the control system from the control unit to storage means within the activation IC. And the selection parameters are transmitted within the control system from the control unit to a logic circuit within the activation IC (claim 2).

In principle, the inventive method could also be used with storage means and selection means which are implemented independently from each other. However, the advantages of the inventive method may be increased by utilizing storage means and a logic circuit which are both implemented within a single IC.

As according to claim 3, the control parameters are transmitted by means of a serial bus.

In principle, one would expect that a reduction of transmission times for control data would require the preferred use of high speed transmission means such as parallel bus systems. However, according to the invention there is no need to transmit the control parameters by such fast transmission means. Hence, the usage of a serial bus system is sufficient and advantageous since it allows to reduce the costs of the control system.

As stated in claim 4, the selection parameters are preferably transmitted by means of a parallel bus.

Preferably, system parameters are measured by measuring means and control parameters are determined in accordance with measured system parameters by determination means within a control unit (claim 5).

This allows to take into account a current status of the control system within the control parameters.

As according to claim 6, preferably system parameters are measured by measuring means and selection parameters are determined in accordance with measured system parameters by determination means within a control unit.

This allows to perform a feedback system, which is in particular but not necessarily advantageous in combination with the method as according to claim 5.

In a preferred implementation of the inventive method, firstly, a plurality of control parameters is transmitted from a control unit by a serial bus system to storage means within an activation IC and stored in said storage means. Secondly, system parameters are measured by measuring means. Thirdly, selection parameters are determined in accordance with measured system parameters by determination means within the control unit. Fourthly, selection parameters are transmitted by a parallel bus system from the control unit to logic means within the activation IC. And fifthly, selection parameters are utilized for the selection of one or more particular of the stored control parameters by the logic means within the activation IC (claim 7).

This results in a particularly advantageous combination of the various before mentioned modifications of the inventive method.

Preferably, the plurality of control parameters comprises one or more base parameters which are corresponding to general and/or measured system parameters. The plurality of control parameters comprises one or more offset parameters which are corresponding to general and/or measured system parameters. The selection parameters cause logic means to either only select base parameters or to select base parameters and offset parameters. And in case of a selection of base parameters and offset parameters the selection parameters further cause the logic means to add the offset parameters to the base parameters by addition means within the activation IC).

This allows to apply the same corrections due to one (or more) system parameters to several different elements within the control system which require different control parameters by means of adding corrective offsets to the different base control parameters as required.

Advantageously, the selected and/or added control parameters correspond to values of target voltages. Moreover, the selected and/or added control parameters are converted into their corresponding voltages by means of digital to analog converters. And the voltages obtained are transported to elements within the controlled system by transportation means.

Within a correspondingly controlled system the advantages of the inventive method can be particularly scooped.

Preferably, the voltage receiving elements within the controlled system are piezoelectric elements and the applied voltages correspond to any desired extension of the piezoelectric elements. The advantage is that the voltage is very well-adjusted to the actual operating point.

Within a preferred embodiment of the inventive apparatus, there are first transmission means between the control unit and the activation IC implemented as a serial bus system and second transmission means between the control unit and the activation IC implemented as parallel bus system (claim 12).

This results in an inexpensive and fast control system as utilized according to the inventive method.

The invention will be explained below in more detail with reference to exemplary embodiments, referring to the figures.

DETAILED DESCRIPTION.

Figure 1:
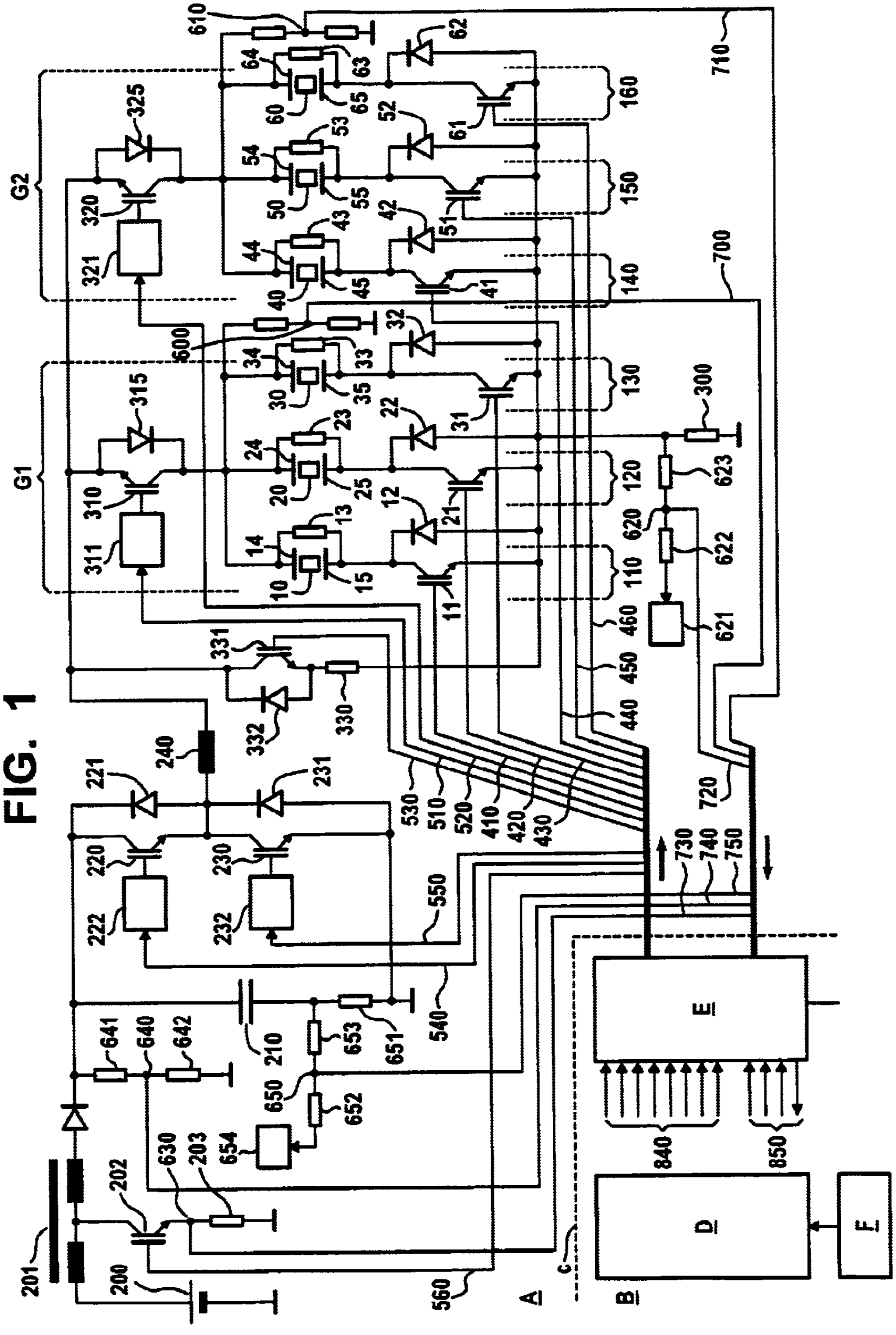
FIG. 1 shows a block diagram of an exemplary embodiment of an arrangement in which the present invention is implemented resp. which can be utilized for an application of the inventive method.

The following description firstly introduces the individual elements in FIG. 1. Then, the procedures of charging and discharging piezoelectric elements 10, 20, 30, 40, 50, 60 are described in general, while additionally referring to FIG. 2*a* through FIG. 2*d*. Thirdly, the ways both procedures are controlled by means of control unit D and activation IC E are explained in more detail, while referring to FIGS. 1 and 3. Fourthly, it is pointed out, how the exemplary control system is driven in accordance with the inventive method in general, while referring to FIGS. 1, 3 and 4.

In FIG. 1 there is a detailed area A and a non-detailed area B, the separation of which is indicated by a dashed line c. The detailed area A comprises a circuit for charging and discharging piezoelectric elements 10, 20, 30, 40, 50 and 60. In the example being considered, these piezoelectric elements 10, 20, 30, 40, 50 and 60 are actuators in fuel injection nozzles (in particular in so-called common rail injectors) of an internal combustion engine. Piezoelectric elements can be used for such purposes because, as is known, they possess the property of contracting or expanding as a function of a voltage applied thereto or occurring therein. The non-detailed area B comprises a control unit D and an activation IC E by both of which the elements within the detailed area A are controlled, as well as measuring components F for measuring occurring rail pressures.

As mentioned above, the circuit within the detailed area A comprises six piezoelectric elements 10, 20, 30, 40, 50 and 60. The reason to take six piezoelectric elements 10, 20, 30, 40, 50 and 60 in the embodiment described is to independently control six cylinders within a combustion engine; hence, any other number of piezoelectric elements might match any other purpose.

The piezoelectric elements 10, 20, 30, 40, 50 and 60 are distributed into a first group G1 and a second group G2, each comprising three piezoelectric elements (i.e. piezoelectric elements 10, 20 and 30 in the first group G1 resp. 40, 50 and 60 in the second group G2). Groups G1 and G2 are constituents of circuit parts connected in parallel with one another. Group selector switches 310, 320 can be used to establish which of the groups G1, G2 of piezoelectric elements 10, 20 and 30 resp. 40, 50 and 60 will be discharged in each case by a common charging and discharging apparatus (however, the group selector switches 310, 320 are meaningless for charging procedures, as is explained in further detail below).

The group selector switches 310, 320 are arranged between a coil 240 and the respective groups G1 and G2 (the coil-side terminals thereof) and are implemented as transistors. Side drivers 311, 321 are implemented which transform control signals received from the activation IC E into voltages which are eligible for closing and opening the switches as required.

Diodes 315 and 325 (referred to as group selector diodes), respectively, are provided in parallel with the group selector switches 310, 320. If the group selector switches 310, 320 are implemented as MOSFETs or IGBTs for example, these group selector diodes 315 and 325 can be constituted by the parasitic diodes themselves. The diodes 315, 325 bypass the group selector switches 310, 320 during charging procedures. Hence, the functionality of the group selector switches 310, 320 is reduced to select a group G1, G2 of piezoelectric elements 10, 20 and 30, resp. 40, 50 and 60 for a discharging procedure only.

Within each group G1 resp. G2 the piezoelectric elements 10, 20 and 30, resp. 40, 50 and 60 are arranged as constituents of piezo branches 110, 120 and 130 (group G1) and 140, 150 and 160 (group G2) that are connected in parallel. Each piezo branch comprises a series circuit made up of a first parallel circuit comprising a piezoelectric element 10, 20, 30, 40, 50 resp. 60 and a resistor 13, 23, 33, 43, 53 resp. 63 (referred to as branch resistors) and a second parallel circuit made up of a selector switch implemented as a transistor 11, 21, 31, 41, 51 resp. 61 (referred to as branch selector switches) and a diode 12, 22, 32, 42, 52 resp. 62 (referred to as branch diodes).

The branch resistors 13, 23, 33, 43, 53 resp. 63 cause each corresponding piezoelectric element 10, 20, 30, 40, 50 resp. 60 during and after a charging procedure to continuously discharge themselves, since they connect both terminals of each capacitive piezoelectric element 10, 20, 30, 40, 50, resp. 60 one to another. However, the branch resistors 13, 23, 33, 43, 53 resp. 63 are sufficiently large to make this procedure slow compared to the controlled charging and discharging procedures as described below. Hence, it is still a reasonable assumption to consider the charge of any piezoelectric element 10, 20, 30, 40, 50 or 60 as unchanging within a relevant time after a charging procedure (the reason to nevertheless implement the branch resistors 13, 23, 33, 43, 53 and 63 is to avoid remaining charges on the piezoelectric elements 10, 20, 30, 40, 50 and 60 in case of a breakdown of the system or other exceptional situations). Hence, the branch resistors 13, 23, 33, 43, 53 and 63 may be neglected in the following description.

The branch selector switch/branch diode pairs in the individual piezo branches 110, 120, 130, 140, 150 resp. 160, i.e. selector switch 11 and diode 12 in piezo branch 110, selector switch 21 and diode 22 in piezo branch 120, and so on, can be implemented using electronic switches (i.e. transistors) with parasitic diodes, for example MOSFETs or IGBTs (as stated above for the group selector switch/diode pairs 310 and 315 resp. 320 and 325).

The branch selector switches 11, 21, 31, 41, 51 resp. 61 can be used to establish which of the piezoelectric elements 10, 20, 30, 40, 50 or 60 will be charged in each case by a common charging and discharging apparatus: in each case, the piezoelectric elements 10, 20, 30, 40, 50 or 60 that are charged are all those whose branch selector switches 11, 21, 31, 41, 51 or 61 are closed during the charging procedure which is described below.

The branch diodes 12, 22, 32, 42, 52 and 62 serve for bypassing the branch selector switches 11, 21, 31, 41, 51 resp. 61 during discharging procedures. Hence, in the example considered for charging procedures any individual piezoelectric element can be selected, whereas for discharging procedures either the first group G1 or the second group G2 of piezoelectric elements 10, 20 and 30 resp. 40, 50 and 60 or both have to be selected.

Returning to the piezoelectric elements 10, 20, 30, 40, 50 and 60 themselves, the branch selector piezo terminals 15, 25, 35, 45, 55 resp. 65 may be connected to ground either through the branch selector switches 11, 21, 31, 41, 51 resp. 61 or through the corresponding diodes 12, 22, 32, 42, 52 resp. 62 and in both cases additionally through resistor 300.

The purpose of resistor 300 is to measure the currents that flow during charging and discharging of the piezoelectric elements 10, 20, 30, 40, 50 and 60 between the branch selector piezo terminals 15, 25, 35, 45, 55 resp. 65 and the ground. A knowledge of these currents allows a controlled charging and discharging of the piezoelectric elements 10, 20, 30, 40, 50 and 60. In particular, by closing and opening charging switch 220 and discharging switch 230 in a manner dependent on the magnitude of the currents, it is possible to set the charging current and discharging current to predefined average values and/or to keep them from exceeding or falling below predefined maximum and/or minimum values as is explained in further detail below.

In the example considered, the measurement itself further requires a voltage source 621 which supplies a voltage of, for example, 5 V DC and a voltage divider implemented as two resistors 622 and 623. This is in order to prevent the activation IC E (by which the measurements are performed) from negative voltages which might otherwise occur on measuring point 620 and which cannot be handled by means of activation IC E: such negative voltages are changed into positive voltages by means of addition with a positive voltage setup which is supplied by said voltage source 621 and voltage divider resistors 622 and 623.

The other terminal of each piezoelectric element 10, 20, 30, 40, 50 and 60, i.e. the group selector piezo terminal 14, 24, 34, 44, 54 resp. 64, may be connected to the plus pole of a voltage source via the group selector switch 310 resp. 320 or via the group selector diode 315 resp. 325 as well as via a coil 240 and a parallel circuit made up of a charging switch 220 and a charging diode 221, and alternatively or additionally connected to ground via the group selector switch 310 resp. 320 or via diode 315 resp. 325 as well as via the coil 240 and a parallel circuit made up of a discharging switch 230 or a discharging diode 231. Charging switch 220 and discharging switch 230 are implemented as transistors which are controlled via side drivers 222 resp. 232.

The voltage source comprises an element having capacitive properties which, in the example being considered, is the (buffer) capacitor 210. Capacitor 210 is charged by a battery 200 (for example a motor vehicle battery) and a DC voltage converter 201 downstream therefrom. DC voltage converter 201 converts the battery voltage (for example, 12 V) into substantially any other DC voltage (for example 250 V), and charges capacitor 210 to that voltage. DC voltage converter 201 is controlled by means of transistor switch 202 and resistor 203 which is utilized for current measurements taken from a measuring point 630.

For cross check purposes, a further current measurement at a measuring point 650 is allowed by activation IC E as well as by resistors 651, 652 and 653 and for example a 5 V DC voltage source 654; moreover, a voltage measurement at a measuring point 640 is allowed by activation IC E as well as by voltage dividing resistors 641 and 642.

Finally, a resistor 330 (referred to as total discharging resistor), a stop switch implemented as a transistor 331 (referred to as stop switch), and a diode 332 (referred to as total discharging diode) serve to discharge the piezoelectric elements 10, 20, 30, 40, 50 and 60 (if they happen to be not discharged by the "normal" discharging operation as described further below). Stop switch 331 is preferably closed after "normal" discharging procedures (cycled discharging via discharge switch 230). It thereby connects piezoelectric elements 10, 20, 30, 40, 50 and 60 to ground through resistors 330 and 300, and thus removes any residual charges that might remain in piezoelectric elements 10, 20, 30, 40, 50 and 60. The total discharging diode 332 prevents negative voltages from occurring at the piezoelectric elements 10, 20, 30, 40, 50 and 60, which might in some circumstances be damaged thereby.

Charging and discharging of all the piezoelectric elements 10, 20, 30, 40, 50 and 60 or any particular one is accomplished by way of a single charging and discharging apparatus (common to all the groups and their piezoelectric elements). In the example being considered, the common charging and discharging apparatus comprises battery 200, DC voltage converter 201, capacitor 210, charging switch 220 and discharging switch 230, charging diode 221 and discharging diode 231 and coil 240.

The charging and discharging of each piezoelectric element works the same way and is explained in the following while referring to the first piezoelectric element 10 only.

Figure 2A:
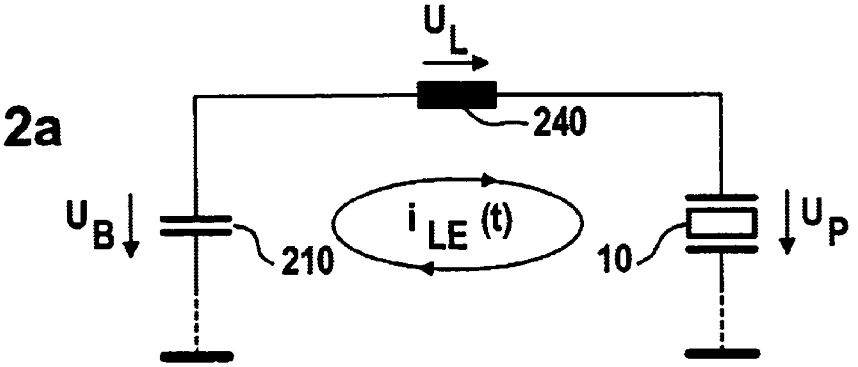
FIG. 2*a* shows a depiction to explain the conditions occurring during a first charging phase (charging switch 220 closed) in the circuit of FIG. 1.
Figure 2B:
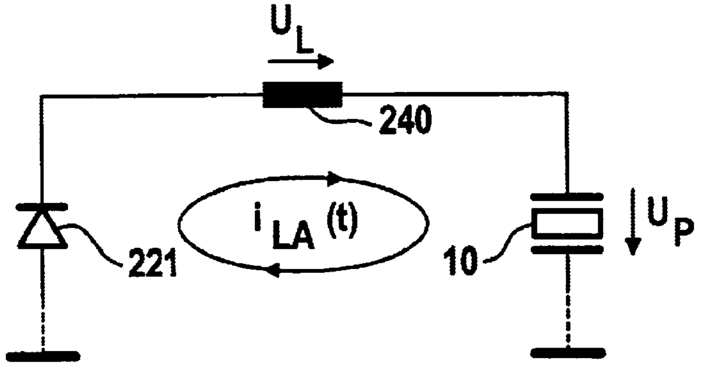
FIG. 2*b* shows a depiction to explain the conditions occurring during a second charging phase (charging switch 220 open again) in the circuit of FIG. 1.

The conditions occurring during the charging and discharging procedures are explained with reference to FIGS. 2*a* through 2*d*, of which FIGS. 2*a* and 2*b* illustrate the charging of piezoelectric element 10, and FIGS. 2*c* and 2*d* the discharging of piezoelectric element 10.

The selection of one or more particular piezoelectric elements 10, 20, 30, 40, 50 or 60 to be charged or discharged, the charging procedure as described in the following as well as the discharging procedure are driven by activation IC E and control unit D by means of opening or closing one or more of the above introduced switches 11, 21, 31, 41, 51, 61; 310, 320; 220, 230 and 331. The interactions between the elements within the detailed area A on the on hand and activation IC E and control unit D on the other hand are described in detail further below.

Concerning the charging procedure, firstly any particular piezoelectric element 10, 20, 30, 40, 50 or 60 which is to be charged has to be selected. In order to exclusively charge the first piezoelectric element 10, the branch selector switch 11 of the first branch 110 is closed, whereas all other branch selector switches 21, 31, 41, 51 and 61 remain opened. In order to exclusively charge any other piezoelectric element 20, 30, 40, 50, 60 or in order to charge several ones at the same time they would be selected by closing the corresponding branch selector switches 21, 31, 41, 51 and/or 61.

Then, the charging procedure itself may take place:

Generally, within the example considered, the charging procedure requires a positive potential difference between capacitor 210 and the group selector piezo terminal 14 of the first piezoelectric element 10. However, as long as charging switch 220 and discharging switch 230 are open no charging or discharging of piezoelectric element 10 occurs: In this state, the circuit shown in FIG. 1 is in a steady-state condition, i.e. piezoelectric element 10 retains its charge state in substantially unchanged fashion, and no currents flow.

In order to charge the first piezoelectric element 10, charging switch 220 is closed. Theoretically, the first piezoelectric element 10 could become charged just by doing so. However, this would produce large currents which might damage the elements involved. Therefore, the occurring currents are measured at measuring point 620 and switch 220 is opened again as soon as the detected currents exceed a certain limit. Hence, in order to achieve any desired charge on the first piezoelectric element 10, charging switch 220 is repeatedly closed and opened whereas discharging switch 230 remains open.

In more detail, when charging switch 220 is closed, the conditions shown in FIG. 2*a* occur, i.e. a closed circuit comprising a series circuit made up of piezoelectric element 10, capacitor 210, and coil 240 is formed, in which a current $i_{LE}$ (t) flows as indicated by arrows in FIG. 2*a*. As a result of this current flow both positive charges are brought to the group selector piezo terminal 14 of the first piezoelectric element 10 and energy is stored in coil 240.

When charging switch 220 opens shortly (for example, a few μs) after it has closed, the conditions shown in FIG. 2*b* occur: a closed circuit comprising a series circuit made up of piezoelectric element 10, charging diode 221, and coil 240 is formed, in which a current $i_{LA}$ (t) flows as indicated by arrows in FIG. 2*b*. The result of this current flow is that energy stored in coil 240 flows into piezoelectric element 10. Corresponding to the energy delivery to the piezoelectric element 10, the voltage occurring in the latter, and its external dimensions, increase. Once energy transport has taken place from coil 240 to piezoelectric element 10, the steady-state condition of the circuit, as shown in FIG. 1 and already described, is once again attained.

At that time, or earlier, or later (depending on the desired time profile of the charging operation), charging switch 220 is once again closed and opened again, so that the processes described above are repeated. As a result of the re-closing and re-opening of charging switch 220, the energy stored in piezoelectric element 10 increases (the energy already stored in the piezoelectric element 10 and the newly delivered energy are added together), and the voltage occurring at the piezoelectric element 10, and its external dimensions, accordingly increase.

If the aforementioned closing and opening of charging switch 220 are repeated numerous times, the voltage occurring at the piezoelectric element 10, and the expansion of the piezoelectric element 10, rise in steps.

Once charging switch 220 has closed and opened a predefined number of times, and/or once piezoelectric element 10 has reached the desired charge state, charging of the piezoelectric element is terminated by leaving charging switch 220 open.

Concerning the discharging procedure, in the example considered, the piezoelectric elements 10, 20, 30, 40, 50 and 60 are discharged in groups (G1 and/or G2) as follows:

Firstly, the group selector switch(es) 310 and/or 320 of the group or groups G1 and/or G2 the piezoelectric elements of which are to be discharged are closed (the branch selector switches 11, 21, 31, 41, 51, 61 do not affect the selection of piezoelectric elements 10, 20, 30, 40, 50, 60 for the discharging procedure, since in this case they are bypassed by the branch diodes 12, 22, 32, 42, 52 and 62). Hence, in order to discharge piezoelectric element 10 as a part of the first group G1, the first group selector switch 310 is closed.

Figure 2C:
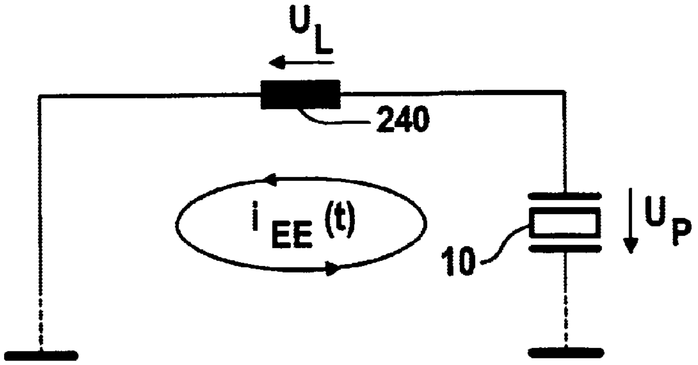
FIG. 2*c* shows a depiction to explain the conditions occurring during a first discharging phase (discharging switch 230 closed) in the circuit of FIG. 1.

When discharging switch 230 is closed, the conditions shown in FIG. 2*c* occur: a closed circuit comprising a series circuit made up of piezoelectric element 10 and coil 240 is formed, in which a current $i_{EE}$ (t) flows as indicated by arrows in FIG. 2*c*. The result of this current flow is that the energy (a portion thereof) stored in the piezoelectric element is transported into coil 240. Corresponding to the energy transfer from piezoelectric element 10 to coil 240, the voltage occurring at the piezoelectric element 10, and its external dimensions, decrease.

Figure 2D:
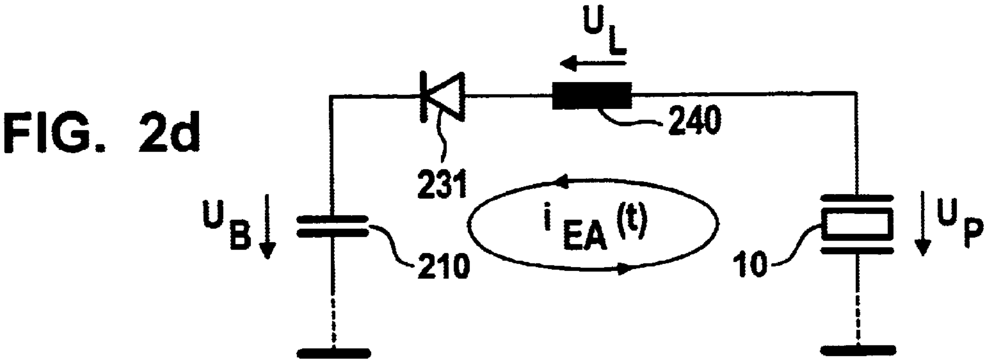
FIG. 2*d* shows a depiction to explain the conditions occurring during a second discharging phase (discharging switch 230 open again) in the circuit of FIG. 1.

When discharging switch 230 opens shortly (for example, a few μs) after it has closed, the conditions shown in FIG. 2*d* occur: a closed circuit comprising a series circuit made up of piezoelectric element 10, capacitor 210, discharging diode 231, and coil 240 is formed, in which a current $i_{EA}$ (t) flows as indicated by arrows in FIG. 2*d*. The result of this current flow is that energy stored in coil 240 is fed back into capacitor 210. Once energy transport has taken place from coil 240 to capacitor 210, the steady-state condition of the circuit, as shown in FIG. 1 and already described, is once again attained.

At that time, or earlier, or later (depending on the desired time profile of the discharging operation), discharging switch 230 is once again closed and opened again, so that the processes described above are repeated. As a result of the re-closing and re-opening of discharging switch 230, the energy stored in piezoelectric element 10 decreases further, and the voltage occurring at the piezoelectric element, and its external dimensions, also accordingly decrease.

If the aforementioned closing and opening of discharging switch 230 are repeated numerous times, the voltage occurring at the piezoelectric element 10, and the expansion of the piezoelectric element 10, decrease in steps.

Once discharging switch 230 has closed and opened a predefined number of times, and/or once the piezoelectric element has reached the desired discharge state, discharging of the piezoelectric element 10 is terminated by leaving discharging switch 230 open.

The interaction between activation IC E and control unit D on the one hand and the elements within the detailed area A on the other hand is performed by control signals sent from activation IC E to elements within the detailed area A via branch selector control lines 410, 420, 430, 440, 450, 460, group selector control lines 510, 520, stop switch control line 530, charging switch control line 540 and discharging switch control line 550 and control line 560. On the other hand, there are sensor signals obtained on measuring points 600, 610, 620, 630, 640, 650 within the detailed area A which are transmitted to activation IC E via sensor lines 700, 710, 720, 730, 740, 750.

The control lines are used to apply or not to apply voltages to the transistor bases in order to select piezoelectric elements 10, 20, 30, 40, 50 or 60, to perform charging or discharging procedures of single or several piezoelectric elements 10, 20, 30, 40, 50, 60 by means of opening and closing the corresponding switches as described above. The sensor signals are particularly used to determine the resulting voltage of the piezoelectric elements 10, 20 and 30, resp. 40, 50 and 60 from measuring points 600 resp. 610 and the charging and discharging currents from measuring point 620. The control unit D and the activation IC E are used to combine both kinds of signals in order to perform an interaction of both as will be described in detail now while referring to FIGS. 1 and 3.

As is indicated in FIG. 1, the control unit D and the activation IC E are connected to each other by means of a parallel bus 840 and additionally by means of a serial bus 850. The parallel bus 840 is particularly used for fast transmission of control signals from control unit D to the activation IC E, whereas the serial bus 850 is used for slower data transfer.

Figure 3:
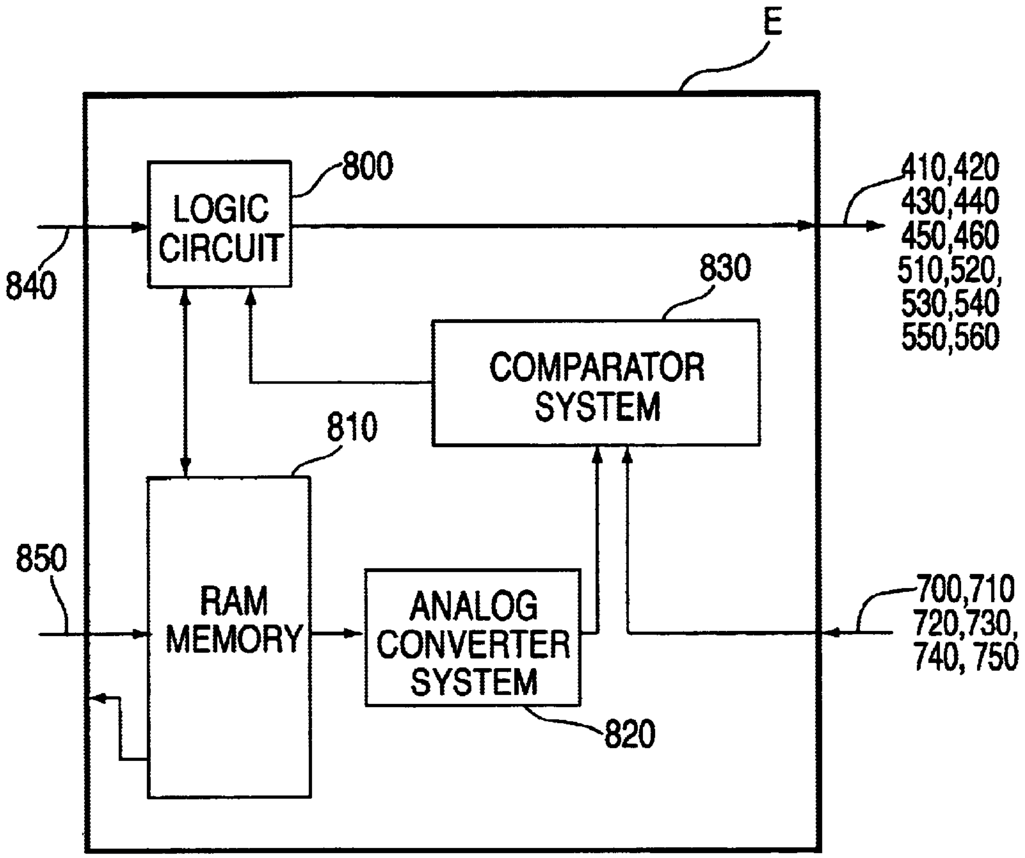
FIG. 3 shows a block diagram of components of the activation IC E which is also shown in FIG. 1.

In FIG. 3 some components of general significance are indicated, which the activation IC E comprises: a logic circuit 800, RAM memory 810, digital to analog converter system 820 and comparator system 830. Furthermore, it is indicated that the fast parallel bus 840 (used for control signals) is connected to the logic circuit 800 of the activation IC E, whereas the slower serial bus 850 is connected to the RAM memory 810. The logic circuit 800 is connected to the RAM memory 810, to the comparator system 830 and to the signal lines 410, 420, 430, 440, 450 and 460; 510 and 520; 530; 540, 550 and 560. The RAM memory 810 is connected to the logic circuit 800 as well as to the digital to analog converter system 820. The digital to analog converter system 820 is further connected to the comparator system 830. The comparator system 830 is further connected to the sensor lines 700 and 710; 720; 730, 740 and 750 and—as already mentioned—to the logic circuit 800.

The above listed components may be used in a charging procedure for example as follows:

By means of the control unit D a particular piezoelectric element 10, 20, 30, 40, 50 or 60 is determined which is to be charged to a certain target voltage. Then, without the inventive method, for example firstly the value of the target voltage (expressed by a digital number) would be transmitted to the RAM memory 810 via the slower serial bus 850. Later or simultaneously, a code signal corresponding to the particular piezoelectric element 10, 20, 30, 40, 50 or 60 which is to be selected and comprising information the address of the transmitted voltage within the RAM memory 810 would be transmitted to the logic circuit 800 via the parallel bus 840. Later on, a strobe signal would be sent to the logic circuit 800 via the parallel bus 840 which gives the start signal for the charging procedure.

The start signal firstly causes the logic circuit 800 to pick up the digital value of the target voltage from the RAM memory 810 and to put it on the digital to analog converter system 820 whereby at one analog exit of the converters 820 the desired voltage occurs. Moreover, said analog exit (not shown) is connected to the comparator system 830. In addition hereto, the logic circuit 800 selects either measuring point 600 (for any of the piezoelectric elements 10, 20 or 30 of the first group G1) or measuring point 610 (for any of the piezoelectric elements 40, 50 or 60 of the second group G2) to the comparator system 830. Resulting thereof, the target voltage and the present voltage at the selected piezoelectric element 10, 20, 30, 40, 50 or 60 are compared by the comparator system 830. The results of the comparison, i.e. the differences between the target voltage and the present voltage, are transmitted to the logic circuit 800. Thereby, the logic circuit 800 can stop the procedure as soon as the target voltage and the present voltage are equal to one another.

Secondly, the logic circuit 800 applies a control signal to the branch selector switch 11, 21, 31, 41, 51 or 61 which corresponds to any selected piezoelectric element 10, 20, 30, 40, 50 or 60 so that the switch becomes closed (all branch selector switches 11, 21, 31, 41, 51 and 61 are considered to be in an open state before the onset of the charging procedure within the example described). Then, the logic circuit 800 applies a control signal to the charging switch 220 so that the switch becomes closed. Furthermore, the logic circuit 800 starts (or continues) measuring any currents occurring on measuring point 620. Hereto, the measured currents are compared to any predefined maximum value by the comparator system 830. As soon as the predefined maximum value is achieved by the detected currents, the logic circuit 800 causes the charging switch 220 to open again.

Again, the remaining currents at measuring point 620 are detected and compared to any predefined minimum value. As soon as said predefined minimum value is achieved, the logic circuit 800 causes the branch selector switch 11, 21, 31, 41, 51 or 61 to close again and the procedure starts once again.

The closing and opening of the charge branch switch is repeated as long as the detected voltage at measuring point 600 or 610 is below the target voltage. As soon as the target voltage is achieved, the logic circuit stops the continuation of the procedure.

The discharging procedure takes place in a corresponding way: Now the selection of the piezoelectric element 10, 20, 30, 40, 50 or 60 is obtained by means of the group selector switches 310 resp. 320, the discharging switch 230 instead of the charging switch 220 is opened and closed and a predefined minimum target voltage is to be achieved.

Introducing now the inventive method, it has to be recalled, that in the considered example rail pressures are measured by measuring components F and the measured values are communicated to the control unit D. Within control unit D, the measured values are utilized while calculating modified control parameters corresponding to any target voltage which is to be applied to the individual piezoelectric elements 10, 20, 30, 40, 50 or 60 according to both the desired action and measured rail pressures.

The rail pressure which is taken into account is changing quite rapidly (for example up to 2000 bar/sec) and hence the time gap between a measurement and the application of corresponding control parameters to any piezoelectric element 10, 20, 30, 40, 50 or 60 should be relatively small. On the other hand, the serial bus system 850, by which the control parameters are transmitted from the control unit D to the activation IC E, is relatively slow (as an example, the transmission of 16 Bit takes sixteen times as long as it would take while using a corresponding parallel bus). Hence, there is a need to perform a control which is as close to real time as possible.

Figure 4:
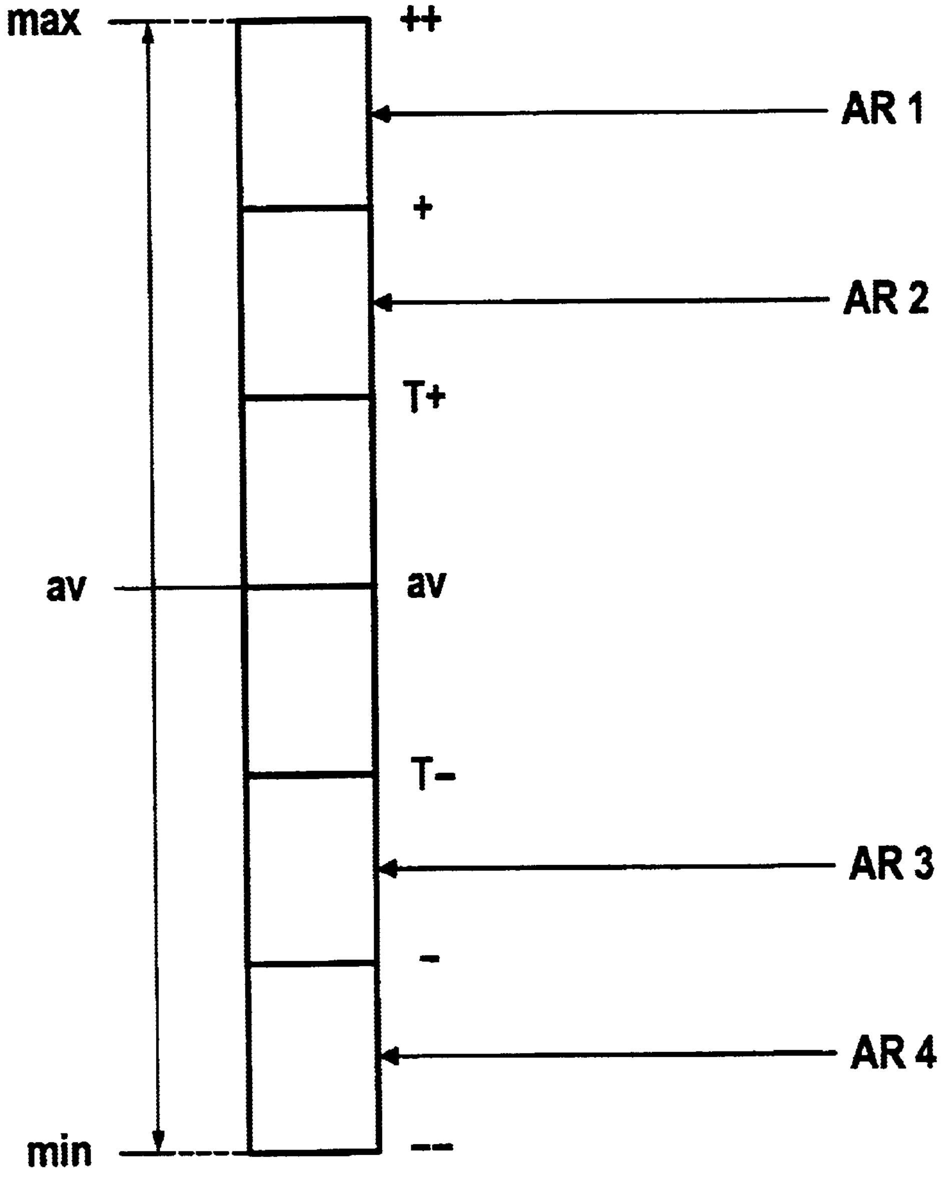
FIG. 4 shows a depiction of offsets for control parameters corresponding to a base target voltage which are required in order to match rail pressure changes as according to the invention.

For this reason, as according to the inventive method, the rail pressure is repeatedly measured by measuring components F during an observation period in advance to the control of a fuel injection. As an example, the observation period might last 10 msec and the measurements are taken after each 1 msec, i.e. 10 values are obtained. From this, as is illustrated in FIG. 4, a maximum (max), a minimum (min) and an average (av) rail pressure are obtained. Furthermore, the range between the maximum and the minimum pressure is subdivided corresponding to any eligible linear or non-linear scale (indicated as ++,+,T+,0,T−,−,−−).

Then, several target voltages for the piezoelectric elements 10, 30 20, 30, 40, 50 and 60 are calculated within the control unit D. While doing so, in addition to the rail pressure further parameters are taken into account, such as the temperature of each individual piezoelectric element 10,

20, 30, 40, 50 or 60. Since in particular the temperature of the individual piezoelectric elements 10, 20, 30, 40, 50 and 60 varies, whereas the rail pressure within a common rail system is for all piezoelectric elements 10, 20, 30, 40, 50 and 60 basically the same (i.e. occurring relative differences are adjusted by constructive means), on the one hand, there is an individual base target voltage calculated for each individual piezoelectric element 10, 20, 30, 40, 50 and 60, while taking into account the average rail pressure which is indicated by av. On the other hand, there are common offset voltages V++, V+, V0, V− and V−− calculated which need to be added to any of the individual base target voltages in order to make them corresponding to rail pressures above or below the average rail pressure av.

In more detail, each offset value corresponds to one pressure value on the scale of pressure values, as is illustrated in FIG. 4. Since small deviations from the average pressure value can be neglected, there are no offsets calculated for pressure values which are equal to or between tolerance values T+, T−. Instead, in these cases a zero offset V0 is used. For larger deviations, in the example considered, there are two offsets V+, V++ calculated which correspond to medium positive or maximum deviations (+,++) and two offsets V−, V−−, which correspond to medium negative or minimum deviations (−,−−), respectively. However, in order to achieve a higher or lower precision, more or less offsets can be calculated.

Later or in parallel hereto, all the control parameters corresponding to the base target voltages as well as to the offsets are transmitted to the RAM memory 810 within the activation IC E by means of the serial bus system 850. As a result, within the activation IC E there are control parameters available, from which by means of addition control parameters can be obtained which more or less match any rail pressure within a given range.

Now, in order to control a fuel injection, shortly before the injection the present rail pressure is measured by measuring components F. Then, in order to select the right offset, the current rail pressure is compared to the rail pressure values corresponding to each individual offset V++, V+, V0, V− and V−−, and the particular offset V++, V+, V0, V− or V−− is selected, the corresponding rail pressure value of which is the closest one to the current rail pressure value. Hence, for any current rail pressure above the AR1 arrow (indicating the middle between pressure values + and ++) in FIG. 4, the offset V++ corresponding to the maximum pressure ++ is selected; for any pressure between arrow AR1 and arrow AR2 the offset V+ corresponding to the medium positive pressure + is selected; for any pressure between arrow AR2 and arrow AR3 the zero offset V0 is selected and so on.

Then, within the control unit D selection parameters corresponding to the particular piezoelectric element 10, 20, 30, 40, 50 or 60, which is used, selection parameters corresponding to its individual base target voltage and selection parameters corresponding to the offset V++, V+, V0, V− or V−− which matches best the current rail pressure are determined and transmitted to the logic circuit 800 within the activation IC E via the parallel bus system 840.

Finally, within the activation IC E the selection parameters are utilized in order to select the piezoelectric element 10, 20, 30, 40, 50 or 60 and to select the appropriate control parameters. The selected offset V++, V+, V0, V− or V−− is added to the base control parameter (i.e. voltage corresponding to the average rail pressure) by addition components (not shown). Then, the resulting voltage is applied to the selected piezoelectric element 10, 20, 30, 40, 50 or 60, as described above.

As a result, the disadvantages of the slow serial bus system 850 are compensated by help of obtaining predictive control parameters in advance, transmitting to and storing them within the RAM memory 810 of the activation IC E likewise in advance and using the fast parallel bus system 840 for selection of the required ones of the stored control parameters.

Figure 5:
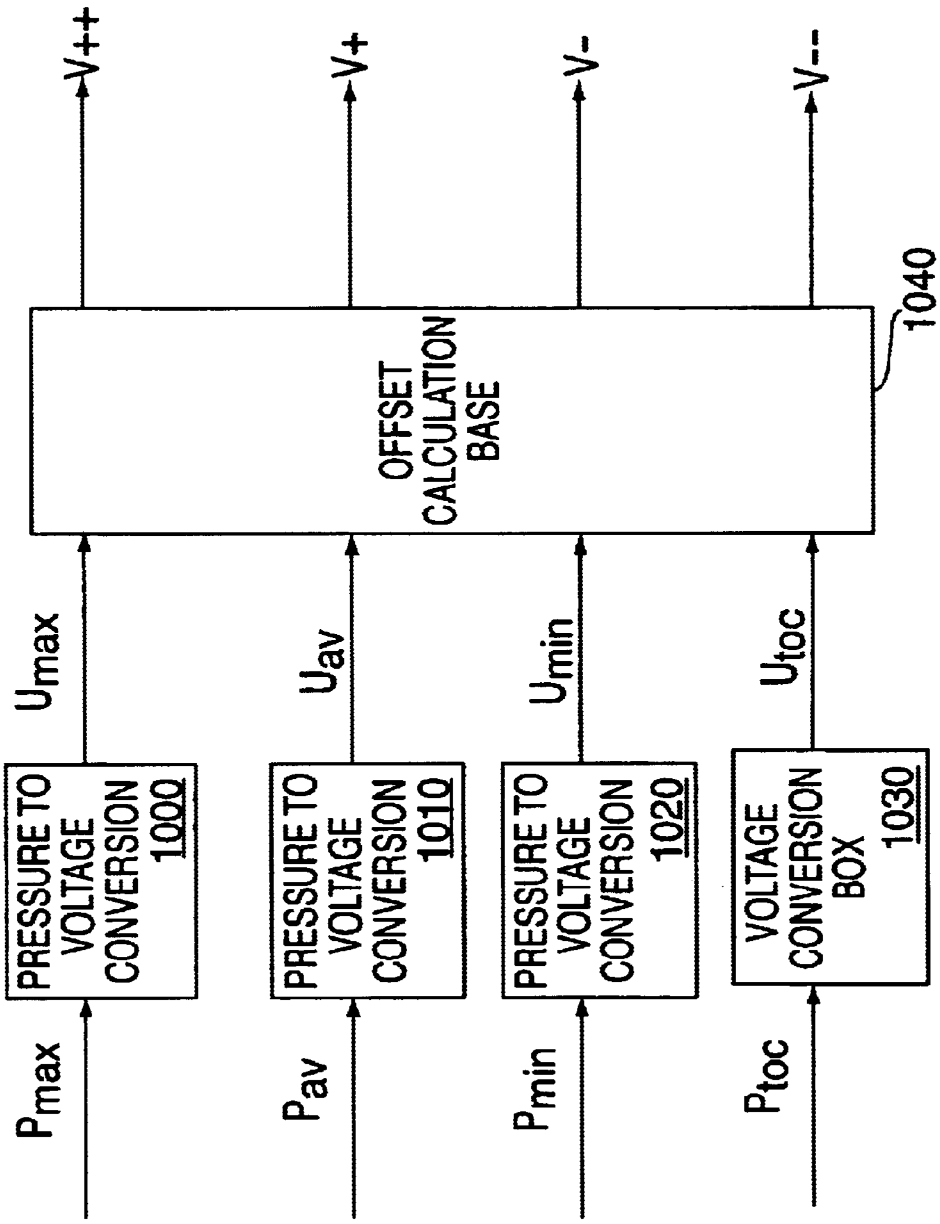
FIG. 5 shows a depiction of how base control parameters and offset control parameters can be determined.
Figure 6:
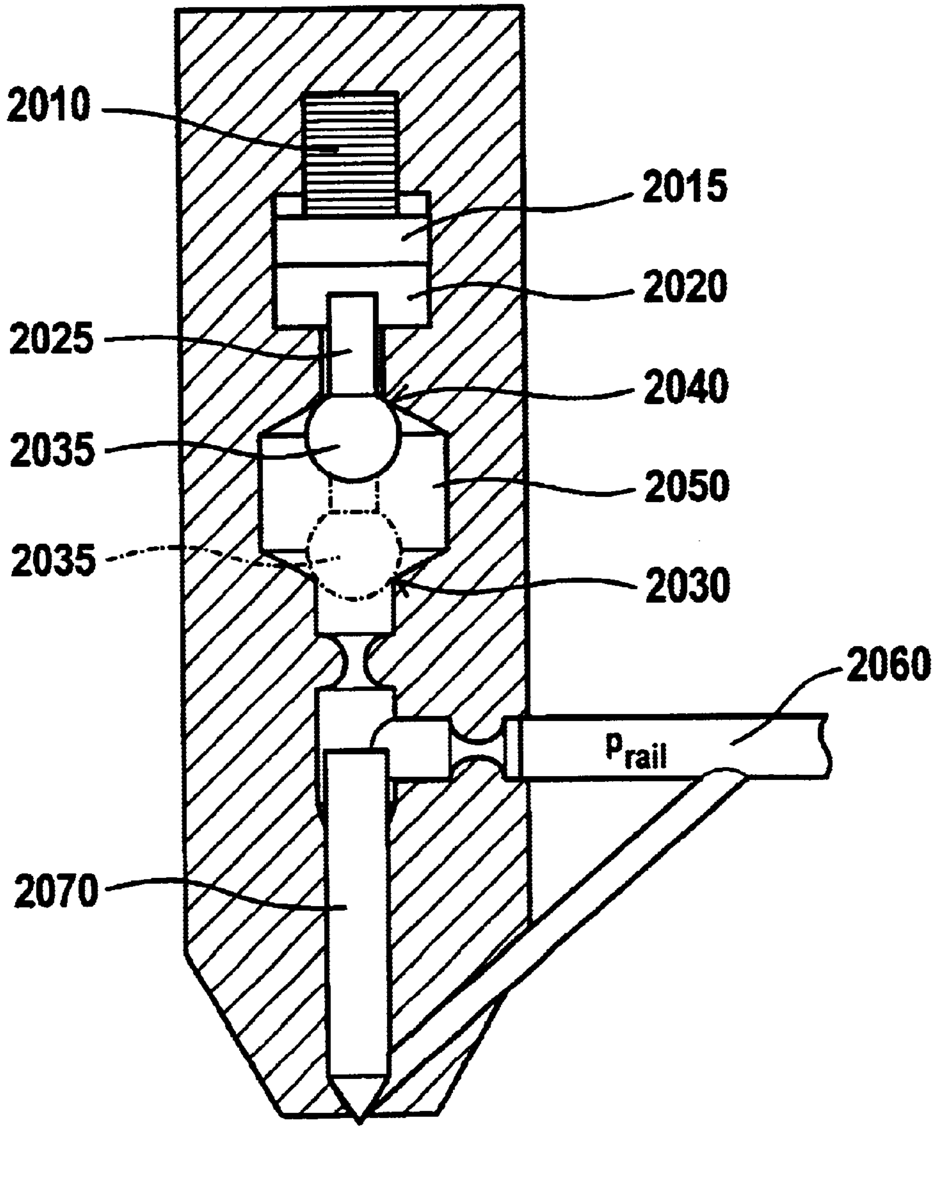
FIG. 6 shows a schematic depiction of a fuel injection system using a piezoelectric element as an actuator.

An example of how the inventive method may be performed, is now described in greater detail while referring to FIGS. 5–6. As already mentioned before, firstly, FIG. 5 shows a depiction of how base control parameters and offset control parameters can be determined. Within FIG. 5, the determination of base and offset control parameters starts with an input of the maximum, average and minimum rail pressure values as depicted by arrows “max”, “av” and “min”. These inputs are determined from a plurality of changing current rail pressures during an observation period (not shown). Thereby, the maximum (“max”) and the minimum (“min”) value are just the largest respectively the smallest rail pressure values which are measured during the observation period. On the other hand, the average rail pressure value (“av”) can be determined by any eligible method. Moreover, it has to be understood that the differences between the maximum (“max”) and the average (“av”) value and those between the average (“av”) and the minimum (“min”) value are generally unequal to one another. Corresponding to the (corrected) maximum rail pressure value (“max”), the average rail pressure value (“av”) and the minimum rail pressure value (“min”,) voltages $U_{max}$, $U_{av}$, and $U_{min}$ are determined which would match the desired control of any piezoelectric element 10, 20, 30, 40, 50 or 60 under presence of said rail pressures. The voltages $U_{max}$, $U_{av}$, and $U_{min}$ are determined by “pressure to voltage conversion” boxes 1000, 1010, and 1020, respectively.

On the other hand, system parameters such as the temperature have to be taken into account for the later control procedure which are specific for each individual piezoelectric element 10, 20, 30, 40, 50 or 60. Hence, in the later procedure the common target voltages (which are a function of the rail pressure) need to be corrected for each individual piezoelectric element 10, 20, 30, 40, 50 or 60 which is to be controlled according to its specific system parameters. However, for the calculation of the offset control parameters this is not required, since they do only correspond to the common voltages as functions of the rail pressure. Hence, the offsets (but not the base control parameters) can be determined uniquely for all piezoelectric elements 10, 20, 30, 40, 50 and 60.

As a further input, a rail pressure tolerance range value is entered as indicated by the small box “tol” (the determination of the tolerance value is not shown). The tolerance value indicates deviations from the average rail pressure value (“av”), which are considered as negligible. Similarly to the maximum, average and minimum pressure values, a corresponding voltage $U_{tol}$ is determined by means of pressure to voltage conversion box 1030. Then the different voltages are fed into an offset calculation base 1040 where the offset V++, V+, V−, V−− are calculated based on the voltages $U_{max}$, $U_{min}$, $U_{av}$ and $U_{tol}$.

It is to be understood, that the description given above holds in case, that larger voltages correspond to larger pressures and vice versa. However, the opposite might apply to other applications or the coherence might be more complex. Moreover, a larger (or smaller) number of offsets might be suitable and/or unequal instead of equal distances between the offset values outside of the tolerance range might be selected. In any case, even though the concrete calculation of the offsets would be affected thereof, the inventive method as a such is not.

The individually corrected average voltage as base control parameter as well as the obtained offsets (V++, V+, V−, V−) are transmitted to the RAM memory 810 within the activation IC E via the serial bus system 850 and are stored there.

Generally, the above described procedure can be repeated (or done in parallel) for each possible action and therefor—for example-four sets of offsets V++,V+,V0, V− and V−− (one set for each possible action) can be obtained and transmitted to the RAM memory 810. However, since a single piezoelectric element 10, 20, 30, 40, 50 or 60 can only perform one action at a time, it is sufficient, to only transmit one base parameter (i.e. one corrected average voltage corresponding to one particular action) per piezoelectric element 10, 20, 30, 40, 50 and 60 to the RAM memory 810.

What is claimed is:

1. A method for providing control parameters for controlling a fuel injection system of an engine, comprising:

transmitting a plurality of control parameters to a storage arrangement within a control system by a transmission arrangement;

storing the transmitted control parameters within the storage arrangement while the engine is operating;

transmitting selection parameters to a selection arrangement within the control system by another transmission arrangement;

selecting stored control parameters in accordance with the transmitted selection parameters by the selection arrangement; and utilizing the selected parameters for controlling elements within the control system.

2. The method according to claim 1, wherein:

a) the control system includes a control unit and an activation IC;

b) the control parameters are transmitted within the control system from the control unit to the storage arrangement within the activation IC; and c) the selection parameters are transmitted within the control system from the control unit to the selection arrangement configured as a logic circuit within the activation IC.

3. The method according to claim 1, wherein the control parameters are transmitted by the transmission arrangement configured as a serial bus.

4. The method according to claim 1, wherein the selection parameters are transmitted by the another transmission arrangement configured as a parallel bus.

5. The method according to claim 1, further comprising:

measuring system parameters by a measuring arrangement; and determining control parameters in accordance with the measured system parameters by a determination arrangement within the control unit.

6. The method according to claim 1, further comprising:

measuring system parameters by a measuring arrangement; and determining selection parameters in accordance with the measured system parameters by a determination arrangement within the control unit.

7. A method for providing control parameters for controlling a fuel injection system, comprising:

transmitting a plurality of control parameters from a control unit to a storage arrangement within a control system by a serial bus system;

storing the transmitted control parameters within the storage arrangement;

measuring system parameters by a measuring arrangement;

determining selection parameters in accordance with measured system parameters by a determination arrangement within the control unit;

transmitting selection parameters by another transmission arrangement configured as a parallel bus system from the control unit to a selection arrangement configured as a logic arrangement;

utilizing selection parameters for a selection of one or more particular of the stored control parameters by the logic arrangement; and utilizing the selected control parameters for controlling elements within the control system.

8. A method for providing control parameters for controlling a fuel injection system, comprising:

transmitting a plurality of control parameters to a storage arrangement within a control system by a transmission arrangement;

storing the transmitted control parameters within the storage arrangement;

transmitting selection parameters to a selection arrangement within the control system by another transmission arrangement;

selecting stored control parameters in accordance with the transmitted selection parameters by the selection arrangement; and utilizing the selected parameters for controlling elements within the control system, wherein a) the plurality of control parameters includes at least one base parameter which corresponds to one of general and measured system parameters;

b) the plurality of control parameters includes at least one offset parameter which corresponds to one of general and measured system parameters;

c) the selection parameters cause the selection arrangement configured as a logic arrangement to select one of base parameters and to select the base parameters and the at least one offset parameter; and d) in case of a selection of the base parameter and the offset parameter the offset parameter are added to the base parameters by an addition arrangement.

9. A method for providing control parameters for controlling a fuel injection system, comprising:

transmitting a plurality of control parameters to a storage arrangement within a control system by a transmission arrangement;

storing the transmitted control parameters within the storage arrangement;

transmitting selection parameters to a selection arrangement within the control system by another transmission arrangement;

selecting stored control parameters in accordance with the transmitted selection parameters by the selection arrangement; and utilizing the selected parameters for controlling elements within the control system, wherein:

at least one of selected and added control parameters correspond to values of target voltages;

the at least one of selected and added control parameters are converted into corresponding voltages by a digital to analog converter; and the voltages obtained are transported to piezoelectric elements within the controlled system by one of the selection arrangement and the transmission arrangement configured as a transportation arrangement.

10. The method according to claim 9, wherein the voltages transported to the piezoelectric elements correspond to any desired extension of the piezoelectric elements.

11. Apparatus for providing control parameters for controlling a fuel injection system of an engine, comprising:

a control unit;

an activation IC connected to the control unit by a transmission arrangement;

a storage arrangement configured in the activation IC, the storage unit storing a plurality of control parameters transmitted by the transmission arrangement while the engine is operating; and a selection arrangement configured in the activation IC.

12. The apparatus according to claim 11, wherein a first transmission arrangement between the control unit and the activation IC is configured as a serial bus system and a second transmission arrangement between the control unit and the activation IC is configured as a parallel bus system.

* * * * *